United States Patent
Kemmler et al.

(10) Patent No.: US 10,013,478 B2
(45) Date of Patent: *Jul. 3, 2018

(54) SYSTEM AND METHOD FOR MODULAR BUSINESS APPLICATIONS

(71) Applicant: SAP SE, Walldorf (DE)

(72) Inventors: Andreas Kemmler, Bonnigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 358 days.

This patent is subject to a terminal disclaimer.

(21) Appl. No.: 14/019,003

(22) Filed: Sep. 5, 2013

(65) Prior Publication Data
US 2014/0013316 A1    Jan. 9, 2014

Related U.S. Application Data

(63) Continuation of application No. 13/328,828, filed on Dec. 16, 2011, now Pat. No. 8,554,797, which is a continuation-in-part of application No. 12/972,024, filed on Dec. 17, 2010, now Pat. No. 9,336,027.

(30) Foreign Application Priority Data

Dec. 15, 2011    (EP) ..................................... 11193810

(51) Int. Cl.
*G06F 17/30* (2006.01)
*G06F 8/65* (2018.01)
*G06F 8/71* (2018.01)

(52) U.S. Cl.
CPC .......... *G06F 17/30607* (2013.01); *G06F 8/65* (2013.01); *G06F 8/71* (2013.01); *Y10S 707/99941* (2013.01)

(58) Field of Classification Search
CPC ........ G06F 17/30607; G06F 8/65; G06F 8/71; Y10S 707/99941
USPC .................................................. 707/792, 782
See application file for complete search history.

(56) References Cited

U.S. PATENT DOCUMENTS

| | | |
|---|---|---|
| 5,911,060 A | 6/1999 | Elliott |
| 5,966,541 A | 10/1999 | Agarwal |
| 6,009,258 A | 12/1999 | Elliott |
| 6,151,569 A | 11/2000 | Elliott |

(Continued)

FOREIGN PATENT DOCUMENTS

| | | |
|---|---|---|
| EP | 2 241 977 | 10/2010 |
| EP | 2 241 997 | 10/2010 |
| WO | 2006/111000 | 10/2006 |

OTHER PUBLICATIONS

European Communication, dated Jun. 17, 2013, from EP Patent Application No. 11 007 332.7.

(Continued)

*Primary Examiner* — Miranda Le
(74) *Attorney, Agent, or Firm* — Jones Day (57) ABSTRACT

A method of adding a program module to an installed program code. A data object having an interface for importation of data into and exportation of data out of the data object, the data object further comprising the program module, a switch identifier and a specification of a call to be inserted into the installed code is provided. Insert the call as specified by the specification of the data object into the installed program code and receive a setting for the switch from a user and storing the setting in a database table.

11 Claims, 7 Drawing Sheets

(56) References Cited

U.S. PATENT DOCUMENTS

| | | | |
|---|---|---|---|
| 6,367,077 B1 | 4/2002 | Brodersen et al. | |
| 6,434,744 B1* | 8/2002 | Chamberlain | G06F 8/65 717/168 |
| 6,546,553 B1 | 4/2003 | Hunt | |
| 6,564,377 B1 | 5/2003 | Jayasimha et al. | |
| 6,769,114 B2 | 7/2004 | Leung | |
| 6,854,112 B2* | 2/2005 | Crespo | G06F 8/61 707/999.202 |
| 6,948,153 B2 | 9/2005 | Bowers | |
| 6,964,034 B1* | 11/2005 | Snow | G06F 8/20 709/201 |
| 6,966,013 B2 | 11/2005 | Blum et al. | |
| 6,981,245 B1 | 12/2005 | Schwabe | |
| 7,137,099 B2* | 11/2006 | Knight | G06F 9/4428 717/100 |
| 7,401,331 B2 | 7/2008 | Leung | |
| 7,472,385 B2* | 12/2008 | Chamberlain | G06F 8/65 717/169 |
| 7,493,614 B2* | 2/2009 | Liu | G06F 9/44526 717/175 |
| 7,698,685 B2* | 4/2010 | Pepin | G06F 9/44526 717/120 |
| 7,823,146 B2 | 10/2010 | Surace | |
| 7,904,339 B2* | 3/2011 | Shah | G06Q 20/20 235/383 |
| 8,079,018 B2 | 12/2011 | Huene et al. | |
| 8,095,561 B2* | 1/2012 | Lu | G06F 17/3056 707/602 |
| 8,201,148 B2 | 6/2012 | Solirov et al. | |
| 8,245,215 B2* | 8/2012 | Extra | G05B 19/0426 709/201 |
| 8,375,364 B2 | 2/2013 | Udupa et al. | |
| 8,429,395 B2 | 4/2013 | Russell et al. | |
| 8,495,319 B2 | 7/2013 | Suishu et al. | |
| 8,533,661 B2* | 9/2013 | Nucci | G06F 8/10 717/105 |
| 8,539,050 B2* | 9/2013 | Tow | G06F 8/65 709/221 |
| 8,762,971 B2* | 6/2014 | Bates | G06F 8/67 717/124 |
| 8,949,822 B2* | 2/2015 | Ross | G06F 8/61 717/174 |
| 9,129,255 B2* | 9/2015 | Toussaint | G06Q 10/06 |
| 2002/0066077 A1 | 5/2002 | Leung | |
| 2002/0100028 A1* | 7/2002 | Kosaka | G06F 9/44521 717/139 |
| 2002/0178435 A1* | 11/2002 | Allison | G06F 8/70 717/106 |
| 2002/0197528 A1* | 12/2002 | Zunke | G06F 8/65 429/144 |
| 2003/0041312 A1* | 2/2003 | Fueki | G06F 15/7867 717/100 |
| 2003/0212983 A1* | 11/2003 | Tinker | G06F 8/65 717/110 |
| 2004/0143723 A1 | 7/2004 | Acker et al. | |
| 2004/0143835 A1 | 7/2004 | Dattke | |
| 2004/0205709 A1* | 10/2004 | Hiltgen | G06F 8/65 717/115 |
| 2005/0132350 A1 | 6/2005 | Markley et al. | |
| 2005/0160414 A1* | 7/2005 | Parnanen | G06F 9/4443 717/148 |
| 2005/0197998 A1* | 9/2005 | Asbury | G06F 9/44505 |
| 2005/0262032 A1* | 11/2005 | Smith | G06N 99/005 706/47 |
| 2006/0026583 A1* | 2/2006 | Remmel | G06F 8/71 717/162 |
| 2006/0026586 A1 | 2/2006 | Remmel et al. | |
| 2006/0070036 A1* | 3/2006 | Cox | G06F 9/4443 717/124 |
| 2006/0095332 A1* | 5/2006 | Riemann | G06F 17/3056 705/22 |
| 2006/0122962 A1 | 6/2006 | Ushiku | |
| 2006/0277539 A1 | 12/2006 | Amarasinghe et al. | |
| 2006/0282899 A1* | 12/2006 | Raciborski | G06F 9/445 726/26 |
| 2007/0083512 A1* | 4/2007 | Pepin | G06F 9/44526 |
| 2007/0168940 A1* | 7/2007 | Lunawat | G06F 8/71 717/108 |
| 2007/0169101 A1 | 7/2007 | Konersmann et al. | |
| 2007/0299679 A1* | 12/2007 | Sudan | G06Q 10/00 717/106 |
| 2008/0172660 A1 | 7/2008 | Arning et al. | |
| 2009/0031298 A1 | 1/2009 | Brunet et al. | |
| 2009/0106459 A1* | 4/2009 | Abels | H04L 41/0853 710/10 |
| 2009/0119195 A1 | 5/2009 | Kurczek et al. | |
| 2009/0293130 A1* | 11/2009 | Henry | G06F 21/74 726/26 |
| 2009/0293132 A1* | 11/2009 | Henry | G06F 21/72 726/27 |
| 2010/0115401 A1 | 5/2010 | Nordine et al. | |
| 2010/0131084 A1 | 5/2010 | Van Camp | |
| 2010/0153782 A1 | 6/2010 | Chandra | |
| 2010/0293541 A1 | 11/2010 | Pall et al. | |
| 2010/0313029 A1* | 12/2010 | Abeln | G06F 9/44526 713/176 |
| 2011/0296377 A1 | 12/2011 | Morozov et al. | |
| 2011/0307798 A1 | 12/2011 | Lezama Guadarrama et al. | |
| 2012/0272212 A1 | 10/2012 | Lu et al. | |

OTHER PUBLICATIONS

European Search Report for EP 11 19 3810.6, dated Jul. 24, 2012.

Faure, D. et al., "KDE Kontact: An Application Integration Framework PIM Components Get Together", Proceedings of the Usenix Annual Technical Conference, Jan. 1, 2004, pp. 115-126, XP002363478.

http:help.sap.com/erp2005_ehp_04/helpdata/EN8f/ f2e540f8648431e10000000a1550b0/framset.htm site accessed on Dec. 3, 2010.

Zaidi et al. "Enhancing Standard Programs Quickly and Easily Via Business Add-Ins (BAD Is): A guide for SAP Developers and u Consultants", 2005, Klee Associates, Inc., retrieved from: http://web.arch ive.org/web/20070314211003/http://www.erpgen ie.com/publications/saptips/022006%20-%20Zaidi%20BAD I.pdf.

SAP Library, "Classic BAdIs", 2007, retrieved from: v http://web.arch ive.org/web/2007071 0 113705/http :/ /help.sap.com/saphelp-nw04s/helpdata/en/e6/d54d3c596f0b26e 1 ooooooooa 1 1402f/content. htm.

Thomas Weiss "Modification-Free Adaptations of SAP Programs? With Enhancements, They're Possible—and Here's How", w 2008, SAP Insider, vol. 9, Issue 3, retrieved from: http://sapinsider.wispubs.com/Article/Modification-Free-Adaptations-of-SAP-Programs--With-Enhancements,-Th eyre-Possible-% E2%80%94-and-H e res-How I 4380.

\* cited by examiner

SYSTEM AND METHOD FOR MODULAR BUSINESS APPLICATIONS

RELATED APPLICATIONS

This application is a continuation application of U.S. patent application Ser. No. 13/328,828, filed Dec. 16, 2011, which claims priority of EP application Serial No. 11193810.6, filed on Dec. 15, 2011 and is a continuation-in-part of U.S. patent application Ser. No. 12/972,024, filed on Dec. 17, 2010 the disclosure of which is incorporated herein by reference in its entirety.

BACKGROUND

The present invention relates to a computer-implemented method of adding a program module to an installed program code.

Business entities require business software for performing an array of essential tasks, such as communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may provide a functional foundation for a software suite (e.g., a plurality of related applications). The software suite may provide various interfaces to released objects (e.g., public objects) so that end-user clients may customize various aspects of their specific install of the software suite. With customer configuration data, customers may be able to modify every aspect of their software experience, including defining the user interfaces, what functions are available on the interfaces, and/or what fields are provided to the user.

To help maintain these software packages, SAP AG (a developer) introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A developer may use enhancement packages to quickly and easily deliver business and industry-specific functionality, enterprise services, and other functions that help improve and simplify the use of software through user interface and other end-to-end process improvements.

These enhancement packages may be cumulative from a functional perspective, e.g., current enhancement packages may contain the entire content of earlier packages. So each enhancement package may be based on the previous one. Enhancement packages may also have the some maintenance duration as the underlying core application. Each enhancement package may contain new versions of existing software components. With the enhancement packages customers can choose which software components are updated in their systems, depending on the new/extended functionality they want to use. The enhancement package architecture provides flexibility for software updates and maintenance, it may also provide some conflicts, especially for applications built on top of the underlying software suite, but not fully integrated into the core software.

Modular Business Applications ("MBA") were designed to address the business priorities of very specific, sometimes small customer/user segments. In order to serve a greater number of customers with specific solutions, the MBAs offer AddOn solutions based on already released products for the installed base, e.g., current users of the underlying software suite. The MBAs may allow for quick delivery of solutions that may be sold without serious discount, may even be restricted to certain regions or languages, and may be limited in their compatibility to a single release only, thus reducing the risk of creating long-term maintenance obligations. Customers may benefit from the MBAs by gaining additional functional scope, tailored to their particular business needs, and built on top of the already installed and familiar stable core.

Modular Business Applications may be delivered as AddOns for software versions that are already released and delivered to customers. These released product versions may contain public objects and private objects. The private objects may be tested to ensure correct operation with the aspects of the underlying software that makes calls to the private objects the private objects are only called by the core software from the same developer). The public objects may be designed for public calls, and may be used to allow customers to customize their specific software install. The public objects may be configured to accept outside calls without generating side-effects, but also may be limited in functional scope. The core software suite may not easily be extended with access to just the public objects. To build whole applications on top of a released version the public objects and associated interfaces are often not complete enough from a functional point of view. To add a highly integrated AddOn application, e.g., an MBA, may require access to both public and private functions, e.g., internal functions.

Further still, modifications to the core objects may need to be done to enable an MBA. Modifications are changes to objects which belong to the underlying application and which are not part of the MBA delivery. Allowing the MBA to change any development object affords great flexibility, but may also create risk of side effects and conflicts when the underlying application delivers a new version of modified objects (e.g. via service packs, enhancement packs, and new releases). Product ERP ("Enterprise Resource Planning") by SAP AG may be used herein as an example of an underlying software suite and core functionality, but other examples from the same or other developers may also implement the example systems and methods described herein.

An example of the overwritten object problem may be illustrated with reference to a released version of the ERP (e.g., ERP 6.0), which is already released and used by many customers. ERP 6.0 includes an extremely large number of development objects, one example may be a class with the name CL_CALCULATE_EXAMPLE. A MBA which is an AddOn based on ERP 6.0 may also be using class CL_CALCULATE_EXAMPLE. This is possible since the class belongs to the underlying product. However, the MBA may need the functionality of the class to be a bit different. For example, it may need CL_CALCULATE_EXAMPLE to return additional values. The MBA may therefore change this class and deliver the adapted (i.e. modified) version of the class to customers with the MBA delivery. In customer systems the existing version of the development object (e.g., the version delivered with the ERP 6.0 shipment) will be overwritten and the extended version may then be available.

At this point, assuming the extension to the class was properly coded (e.g., has no unintended side-effects to the ERP), there should not be any conflicts. However, ERP 6.0 is delivering Support Packages ("SP") and Enhancement Packages ("EHP") to customers. These deliveries could also contain the class CL_CALCULATE_EXAMPLE, as this class belongs to the core ERP, and it might be corrected or enhanced by the core ERP development teams. Customers who install these ERP SPs and ERP EHPs to their systems may then get class CL_CALCULATE_EXAMPLE again. This may overwrite the version delivered with the MBA, the one containing the modification. Since the modification is no longer in the customer's systems, the MBA may have serious problems when calling the overwritten version.

The above illustrated problem with modifications is generally known, and may be solved with so called conflict resolution transports (CRTs). Customers may no longer be allowed to install the core SP to their system directly, but only in combination with a conflict resolution transport. This CRT may contain a resolution of any conflicts. In the simplest case it may just contain the modification again (e.g., modifying the new version similarly to how the MBA modified the older version). In more complicated cases it might also contain additional adaptations that may be needed to work with the new core SP/EHP. This could mean that it contains even more modifications or a changed/adapted version of the previous modification. Installed together with the ERP SP/EHP the CRT may ensure that the right version of the modified object is available in the customer system. However, building CRTs requires substantial effort and the CRTs have to be built as long as there are new SPs/EHPs (e.g., indefinitely). Further, the complexity increases as each new EHP may have its own maintenance line which means its own SPs for which CRTs also have to be offered.

Example embodiments of the present invention minimize the maintenance burden of CRTs in the context of MBAs and enhancement packages described above.

It is as such known from the prior art to modify an already installed program code for adding or modifying a program function. However, this can create maintenance issues with respect to future program updates of the installed code.

The present invention therefore aims to provide a computer-implemented method of adding a program module to an installed program code, as well as a respective computer program product and computer system.

DETAILED DESCRIPTION

Embodiments of the invention may provide a computer-implemented method of adding a program module to an installed program code by providing a data object having an interface for importation of data into and exportation of data from the data object. The data object may comprise a program module, a switch identifier, and a specification that may specify a call to be inserted into the installed code.

The program module of the data object may contain executable code for providing a modification of a program function of the installed code or an additional program function to be added to the installed code. The specification may specify a location of the installed code, such as a particular line of code, where a call for calling the data object is to be inserted. For example, the data object may have an assigned unique identifier that is given by the specification. In this case, the call may have the unique identifier of the data object as a parameter for calling the data object identified by that unique identifier.

The switch identifier of the data object may be a unique identifier for identification of a switch.

A 'switch' as used herein may be a software-implemented switching function for switching on or off the execution of a particular fragment of executable code that implements a function. Such a software-implemented switching function is described in European Patent Application number 11 185 647 (SAP.211-05EP), which is herein expressly incorporated by reference.

In the present case, the switch that is identified by the switch identifier may serve for switching on or off the program module within the provided data object. The switch may be put into an 'on' or 'off' position by entering and storing a respective setting for the switch.

The interface of the data object may be a software-implemented interface for importation and exportation of data for the purpose of providing input data to the program module and outputting a result of the processing of the input data that is obtained by processing the input data by means of the program module. The data that is to be imported into the data object may be specified in the data object, such as by a database query that may return the data that is to be imported or by specifying the names of the specific characteristics or key values that have to be read from a database or by specifying a technical key, such as a storage location or a table identifier of a table from which the data has to be read for importation into the data object.

The data object may be designed such that the imported data is transformed by execution of the program module and then written back to the same storage location from which it had been read before. Alternatively, the storage location may be specified in the data object such that the data that results from the execution of the program module is exported from the data object by the storage operation of the data to a specified storage location.

A user may activate the additional program module that is provided by means of the data object by setting the switch to a logical 'on' state. This may be done via a user interface. For example, if the user enters via the user interface that the program module is to be switched on, a logical '1' may be stored as the setting of the switch that is identified by the switch identifier given in the data object. That switch identifier may be used as an access key for storing and retrieval of the setting that is assigned to the switch.

In accordance with an embodiment of the invention, an installation program may be started for adding the program module. The installation program modifies the installed program code by inserting the call as specified by the data object into the installed code.

When execution of the installed program code is started after the program module has been added, the following steps may be performed in accordance with embodiments of the invention: when the code execution reaches the call that has been inserted, the interface of the data object may be invoked, such that the data is imported into the data object. The setting of the switch may be retrieved using the switch identifier of the switch. This may be done by a so-called switch framework. The switch framework may be implemented by a program code that is activated automatically when the data object is called for determining whether the switch that is identified by the switch identifier of the data object is 'on' or 'off'. If the switch has a first logical state (i.e., the setting of the switch indicates 'off' or logically 0), the execution of the program module may not be invoked such that the imported data is not modified. The unmodified data may then be exported. As a result, the execution of the call may not result in any modification of the data.

In contrast, if the switch has a second logical state (i.e., 'on' or logically '1'), the program module may be invoked for processing of the imported data. As a result of the processing the imported data may be modified in some way, such as for implementation of a particular program function. The resultant modified data may then be exported. As a result, the functionality of the installed program code may be modified by the added program module.

Embodiments of the invention are particularly advantageous as an additional functionality may be added to an already installed program code with minimal changes to the installed program code, i.e. by adding a single call instruction. This eliminates or minimizes the need for testing the installed program code after the modification.

In accordance with an embodiment of the invention the installed program code with the inserted call to the data object is updated. An update of the program code may be provided that comprises the call as specified in the data object. This update may be distributed to all computer systems on which the program code is installed with or without the data object. In other words, the update may be provided both to users that have decided to install the data object, thus, modifying the installed program code by inserting the call and also to users that decided not to do so.

When the updating of the installed program code is executed, the presence of the specified call in the update may have the effect that the call is inserted into the installed program code at those installations where the data object had not been installed and that the call is overwritten by the same call in those installations where the data object had been installed. As a consequence, the same installed program code may result in all installations such that the option to invoke the additional functionality provided by the program module becomes the standard for all installations by inserting the call. This facilitates future updates because a need for various updated versions depending on whether the data object has been installed or not is avoided.

In accordance with embodiments of the invention, the program module that is contained in the data object may be updated after the installed program code has been updated. An updated data object with the updated program module may be provided. The updated data object may be identical to the original data object as far as the interface is concerned and as to the switch identifier. The updated data module may comprise the updated program module and is devoid of a specification of the call as the call has been integrated into the standard program code by means of the preceding updating of the installed program code. Hence, the updating of the program module may be executed simply by overwriting the original data object by the updated data object without a need for installation of the updated program module. This is particularly advantageous as no modification of the installed program code is required for updating the program module.

In another aspect the present invention relates to a computer program product, in particular a digital storage medium, storing computer executable instructions for performing a method of the invention.

In still another aspect the present invention relates to a computer system comprising an electronic processor for execution of an installed program code, and a storage means for storing a data object having an interface for importation of data into and exportation of data out of the data object. The data object may further comprise the program module, a switch identifier and a specification of a call to be inserted into the installed code, a database table for storing a setting for the switch received from a user. The computer system may also comprise an installation program for installation of the data object comprising inserting the call as specified by the specification of the data object into the installed program code, and a user interface for receiving a setting of the switch from a user and for storing the received setting in the storage means using the switch identifier as an access key. The electronic processor may be operable to execute the installed program code with the inserted call by calling the data object upon execution of the call that has been inserted into the installed program code, wherein the setting of the switch is retrieved from the database table using the switch identifier of the data object as an access key, in case the switch setting indicates a first logical state of the switch, exporting the unmodified data, in case the switch setting indicates a second logical state, executing the program module for processing of the imported data, and exporting of the processed data via the interface.

In accordance with embodiments of the invention, the program module to be added to the installed program code may be an add-on, i.e. a modular business application for a software version that is already released and delivered to customers.

In accordance with an embodiment of the invention, the installed program code may be a core object.

In accordance with embodiments of the invention, the data object that comprises the program module may be implemented as a business add-in (BAdI).

Example embodiments of the present invention may minimize the resource-cost of maintaining the CRTs by introducing the modification BAdI concept and a new way to bring the modification back to standard in older releases. The modification BAdI concept is a way of implementing modifications that makes the modifications "switchable," This means the modifications may be activated and deactivated. A BAdI ("Business Add-In") may be an object-oriented enhancement option. The main characteristic of a BAdI is that it may provide a mechanism to change the functionality of a well-defined business function (e.g., a BAPI) without making changes to the delivered source code.

Future upgrades of the original business function can be applied without losing the customer-specific enhancements or the need to merge the changes. The two code lines (the original one and the customer-specific coding) are strictly separated but still concurrently implemented. The modification BAdI concept of the below described example embodiments of the present invention may be based on this BAdI enhancement option.

In example embodiments of the present invention each MBA may get a new BAdI definition, i.e. the modification BAdI. This BAdI definition may be delivered in the current development source code version of the application the MBA is based on (e.g., the core ERP). The modification BAdI may contain a separate method for each coding modification. The modification BAdI may also be delivered in SPs of the application the MBA is based on, beginning with the first subsequent SP or the earliest SP possible. Since the modification BAdI is a completely new (e.g., independent) object it should not cause any problems in the SPs and it should also not increase the effort for customers based on the installation of these SPs.

An MBA may often be based on already released and therefore old SPs, where the modification BAdI is not yet available in the MBA's development system. Therefore, example embodiments may first perform a classical modification to add the modification BAdI to the underlying software. The BAdI may be downported to the underlying software only after the development of the MBA is completely done. This may mean that all of the places where a modification to the underlying software has to be done are known by then and therefore the corresponding methods in the BAdI may already be created and implemented. It may therefore be unlikely that the BAdI needs to be changed/extended after the MBA is completely finished, which means the BAdI and all its methods will likely be stable it should not cause any modification adjustment effort in the future.

One example embodiment of the present invention may include first creating the BAdI in the MBA development system. Next, the BAdI may be enhanced by new methods for each modification that become necessary during the development period of the MBA. At the end of MBA development, when all modifications are done and all BAdI methods are created, it may then be copied into the current development codeline of the application the MBA is based on. This codeline may also be set as the one which contains the original version of the BAdI. Next, the modification BAdI may be down-ported into the support package of all future releases of the application the MBA is based on, which are supported by the MBA.

A conventional modification would have just changed/extended the source code of the modified object. However, in example embodiments of the present invention, the modification may be done differently. For example, the source code of the modified object may be changed only minimally, such as, only inserting the call of the new BAdI method. Then, all required changes that made the modification necessary may be implemented as a common BAdI implementation of the BAdI now called in the modified object (e.g., after the inserted call). Thus, the modification may be implemented with pre-existing tools designed for a conventional BAdI implementation, and the modification is made by only adding the BAdI definition and the BAdI call. The signature/interface of the BAdI method should also support importing and changing the variables from the modified source code that are needed to implement the required changes. The modified source code may just be extended by the call of the new BAdI method, including the coding needed to supply the interface parameters of the new BAdI method and the coding needed to change the flow logic of the modified source code corresponding to the result of new BAdI method. In this context, the inclusion of the modified source code is relatively small, and in at least one example embodiment it is just the call of the new BAdI method.

In some example embodiments, only one modification BAdI may be needed for each MBA, especially when the number of modifications is relatively small. However, in example embodiments where lots of modifications are needed it might be advantageous to work with more than one modification BAdI. This may help avoid bottleneck situations when a single modification BAdI has to be extended and implemented by many different developers. Multiple modification BAdIs in an MBA is one option available for some example embodiments, and specific implementations may use a single BAdI or multiple BAdIs.

Example embodiments that modify with a BAdI may force the MBA developer (e.g., the modifier) to clearly define the variables needed from the modified source code and the MBA developer responsible for the modified source code may then clearly understand which variables are used and potentially changed. As a result, there may now be a clear connection between the modified object and the modification, while providing clear separation of original source code and changed/modified source code.

In addition to the modification BAdI there may be one specific Business Function and one specific switch for each MBA. Business Functions and Switches are entities of the Switch Framework, which is described in related applications, including U.S. patent application Ser. No. 12/911,245, which is herein expressly incorporated by reference. Both the Business Function and switch may be created in the development system of the MBA and shipped as part of the MBA. The implementation(s) of the modification BAdI may get assigned to the MBA's switch. As a result, after the installation of the MBA there will be no business process changes to the underlying application, the installation will be without disruption, and the new features coming with the MBA can be activated by customers anytime later after the installation (e.g., by activating the switch).

Figure 1A:
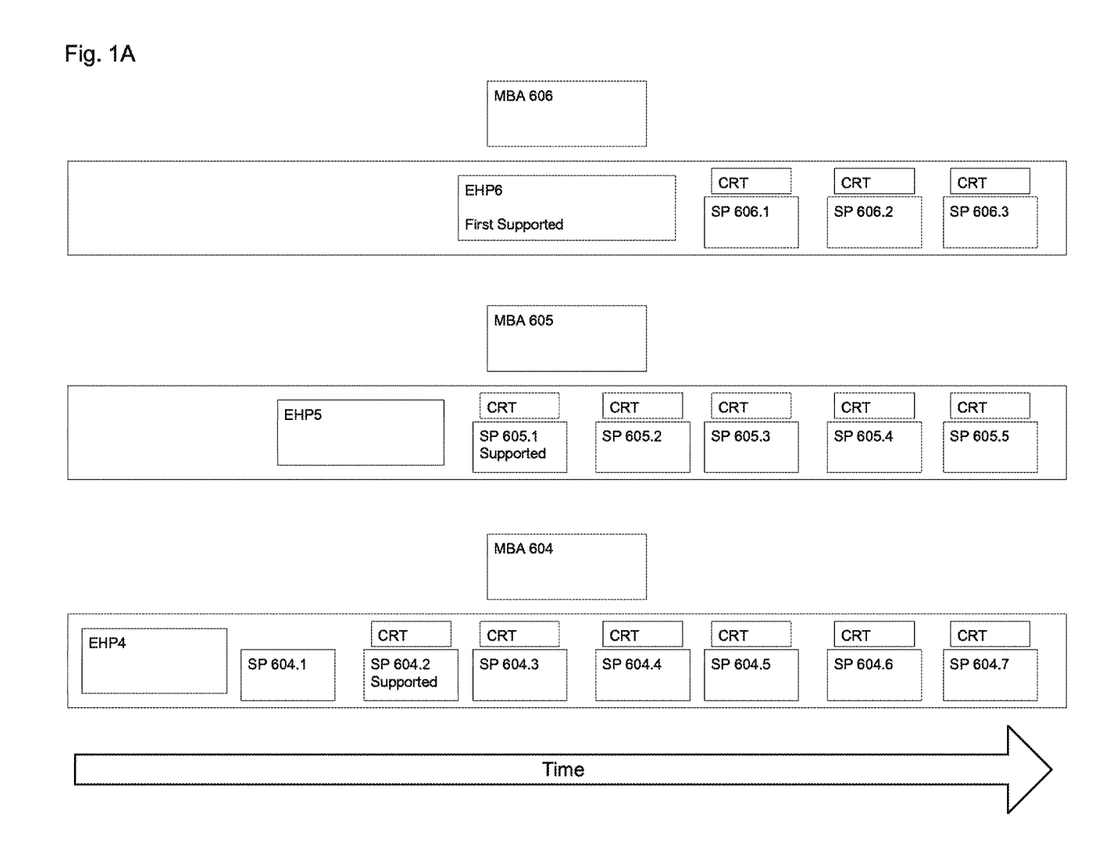
FIG. 1A illustrates an example embodiment of update releases and conflict resolution transports, according to one example embodiment of the present invention.

As was discussed above, a conflict may arise each time an object, which was modified by the MBA, is changed in its normal SP/EHP. As soon as customers would apply this SP/EHP to a system that also contains the modifying MBA, the modification would be overwritten. This may cause the MBA to falter. To avoid these conflicts, the ERP offers the CRTs. The CRTs may simply contain the modification anew, or provide some other solution for resolving conflicts. The CRTs may then be required to be applied by customers together with the core SP to avoid the MBA to falter. Creating and offering CRTs means additional development effort, since each correction/support package has to be checked for conflicts with any of the MBA modifications and conflict resolution transports have to be created if necessary. This is illustrated in FIG. 1A where development/release time is illustrated from left to right. Each EHP (e.g., EHP 4, 5, or 6) may be followed by a series of update packages (e.g., SP 604.1 to SP 604.7). Further, the MBAs (e.g., MBA 604, 605, and 606) are each based on an underlying package. For example, MBA 604 is based on SP 604.2, MBA 605 is based on SP 605.1, and MBA 606 is based on EHP 6. As illustrated, starting with the package/release that first supports the MBA, a CRT may be required for that package/release and every subsequent package/release. Further, any subsequent modifications to the MBA or underlying software due to the MBA may require its own set of CRTs for every package subsequent to and including the first package to support the modification.

To avoid conflicts completely the modifications done by the MBA may need to be part of a SP of the underlying application. However, this may make the SP too large and complex, especially when additional objects are changed. Additionally, integration risks side-effects occurring in the SP, which should be avoided to maintain the integrity of these core updates and expansions. Example embodiments provide two ways to minimize or eliminate conflicts. First, the modifications should be brought into the SPs only when the corresponding source code gets changed by a separate correction (e.g., is scheduled for development changes independent of the needed MBA changes). In the context of the SP development system, this may mean the source code object is already part of the SP's piece list, and therefore no additional object should be required to be delivered in the SPs, which should eliminate all potential conflicts, other than the actual change required by the MBA.

Figure 1B:
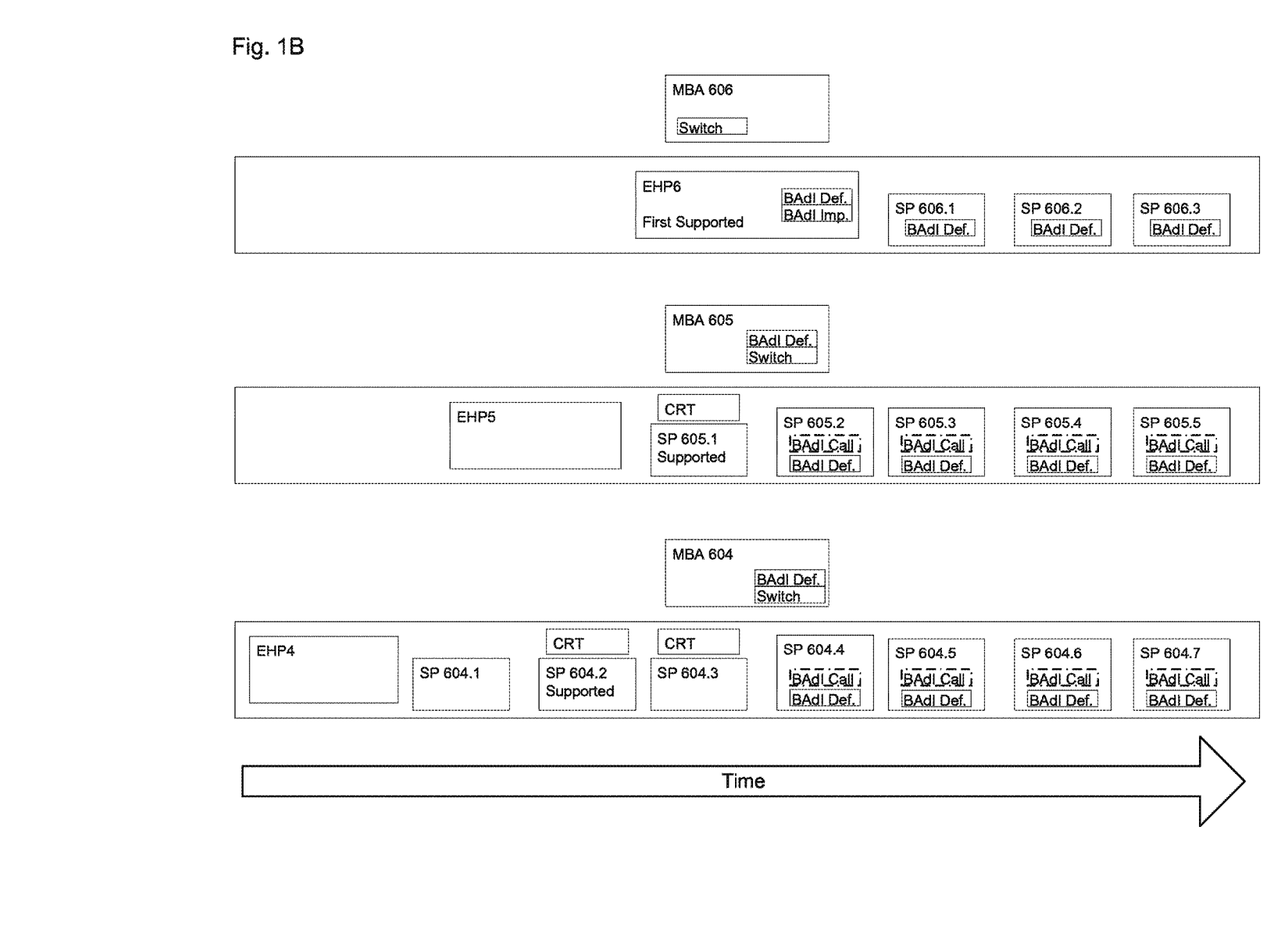
FIG. 1B illustrates an example embodiment of an optimized process using Add-in definitions for add-on applications, according to one example embodiment of the present invention.

Stability is maintained and conflicts reduced during the MBA modification, by doing the modifications in the way described in the previous section, with only minimal changes in the modified source code and especially by having the new source code switchable. This implementation of the modification BAdI may be assigned to a switch and this switch (and the implementation itself) may be available in the core SP for activation. One example embodiment of this optimized implementation is illustrated in FIG. 1B. Again, development and release time is shown from left to right. MBA 604 now includes a BAdI definition, e.g., a separate object defining the modification code, and a switch within the switch framework. After the MBA is finished, e.g., ready for release, the BAdI definition may be down-ported into each subsequent SP. Thus, SP 604.4 to SP 604.7 also include the BAdI definition. The BAdI definition may be a wholly contained object, and therefore not affecting the actual SP code. However, the SP code may be affected by the addition of the BAdI call, e.g., as illustrated with a broken outline. Additionally, the MBA is based on SP 604.2 and a CRT may be needed for each SP subsequent to and including the SP the MBA is based on, but before the MBA is released. Thus, SP 604.2 and SP 604.3 may require CRTs, since they were released before the MBA's development timeframe was finished, and therefore do not have the down-ported BAdI definition. Eventually, the code that was modified to support the MBA may be scheduled to be included in a major release, e.g., EHP 6. In this situation the BAdI definition, BAdI implementation, and BAdI calls may be included in the underlying software package (e.g., EHP 6). The BAdI calls may not be done as modifications at this point, and therefore will not need to be added in subsequent SP packages (e.g., SP 606.1 to 606.3).

With this two part arrangement, e.g. integration during the normal development schedule and use of the modification BAdI, the modification may be incorporated in the core SPs over time. When an object gets changed, for which there is a modification in any MBA, this modification may now be included into the object. CRTs may no longer be needed as conflicts will be resolved in the core SP. Eventually, the MBA may become a modification-free AddOn. Since the MBA may access only objects that are part of the SP anyway, the core SP may not contain additional objects, and the stability of the core SP is not influenced because the only modification is the call of the BAdI method. Also a complete inclusion of the MBA into a future EHP should be easy, minimizing conflicts and side-effects. The described incorporation of the modifications may just be completed in the codeline of the new and the MBA could then be shipped as part of this EHP.

Figure 2:
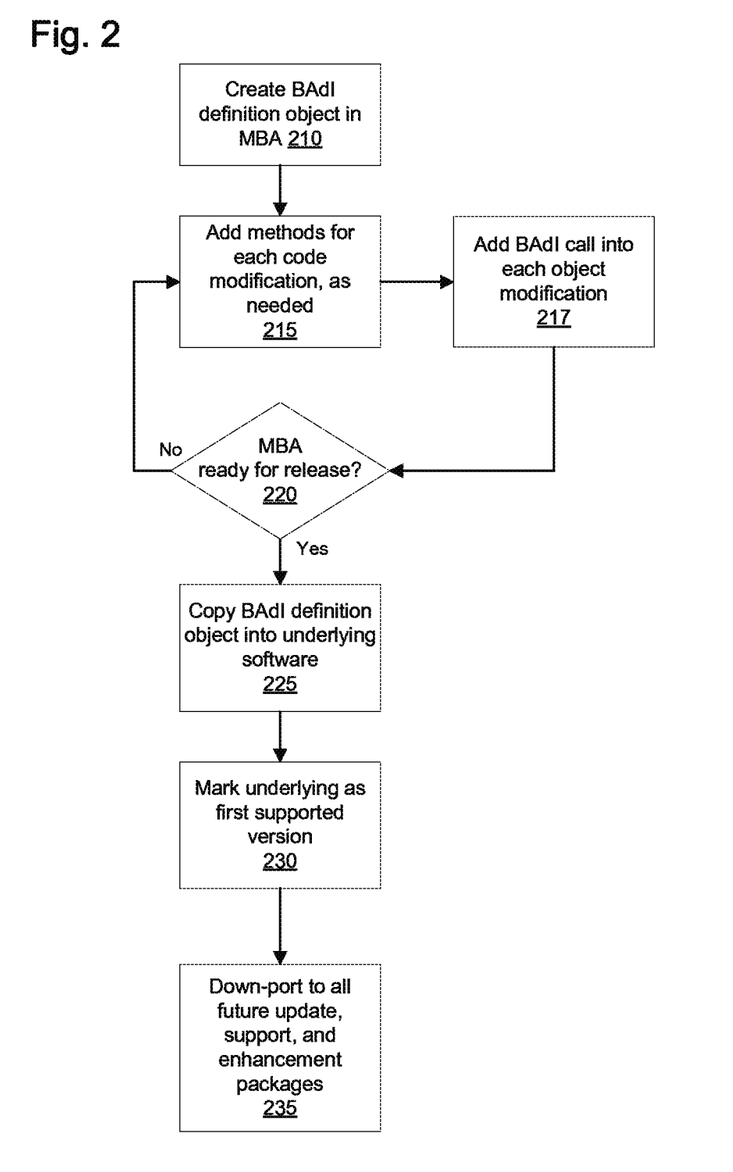
FIG. 2 illustrates one example method, according to one example embodiment of the present invention.

FIG. 2 illustrates one example method according to an embodiment of the present invention. First, at 210, an MBA application may have a BAdI definition object created, which may contain the code implementations needed within the underlying software to let the MBA function properly. That code may be added in 215 as needed by the MBA development. A BAdI call may then be inserted into each object that the MBA needs to modify in the underlying software, e.g., at 217. This may continue during the duration of the MBA development timeframe, via 220. At 225, the BAdI definition may be copied into the underlying software, and at 230 the current version, e.g., the version the MBA is based on, may be marked as the first supporting version of the underlying software. At 235, for an ongoing basis, the BAdI definition may be down-ported to all future update packages, support packages, enhancement packages, and release versions.

Figure 3:
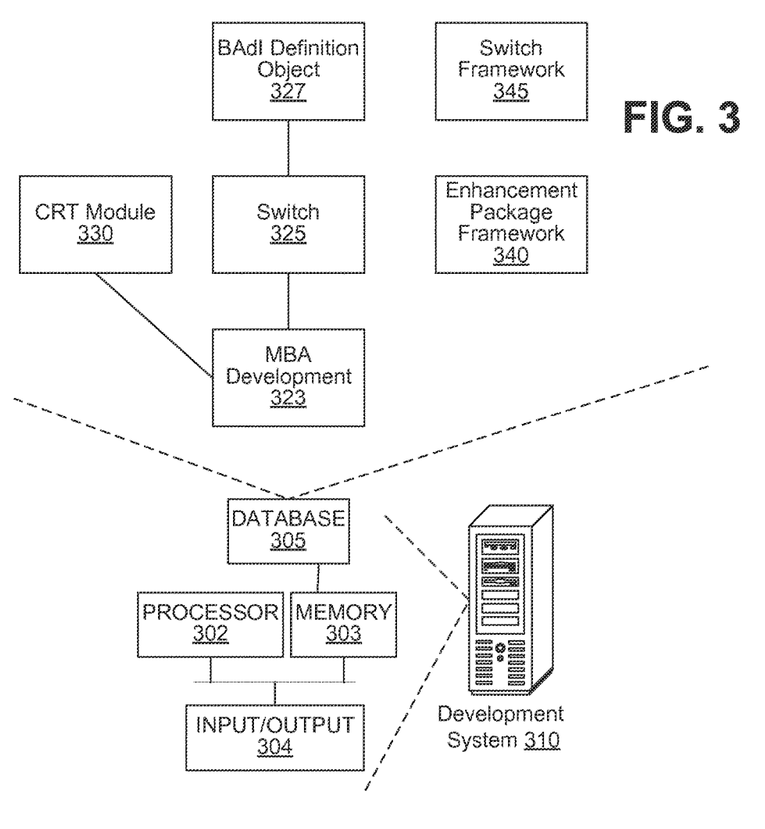
FIG. 3 illustrates one example system, according to one example embodiment of the present invention.

FIG. 3 illustrates one example system, according to an embodiment of the present invention. The example may include one or more server computer systems, e.g., development system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may include data comprising the various software components of the other example embodiments of the present invention. For example, the database may include the MBA development environment 323. The database may include the enhancement package framework 340 and the switch framework 345. The MBA development environment 323 may include one or more switches 325, e.g., based on the switch framework 345. The database may further include the BAdI definition objects 327, that may be defined as part of the MBA development process. The database may also include a CRT module 330 for identifying conflicts and defining resolution transports for those conflicts. These entities may be stored in database 305, or may be distributed across other systems, independently or connected via a communication network.

Figure 4:
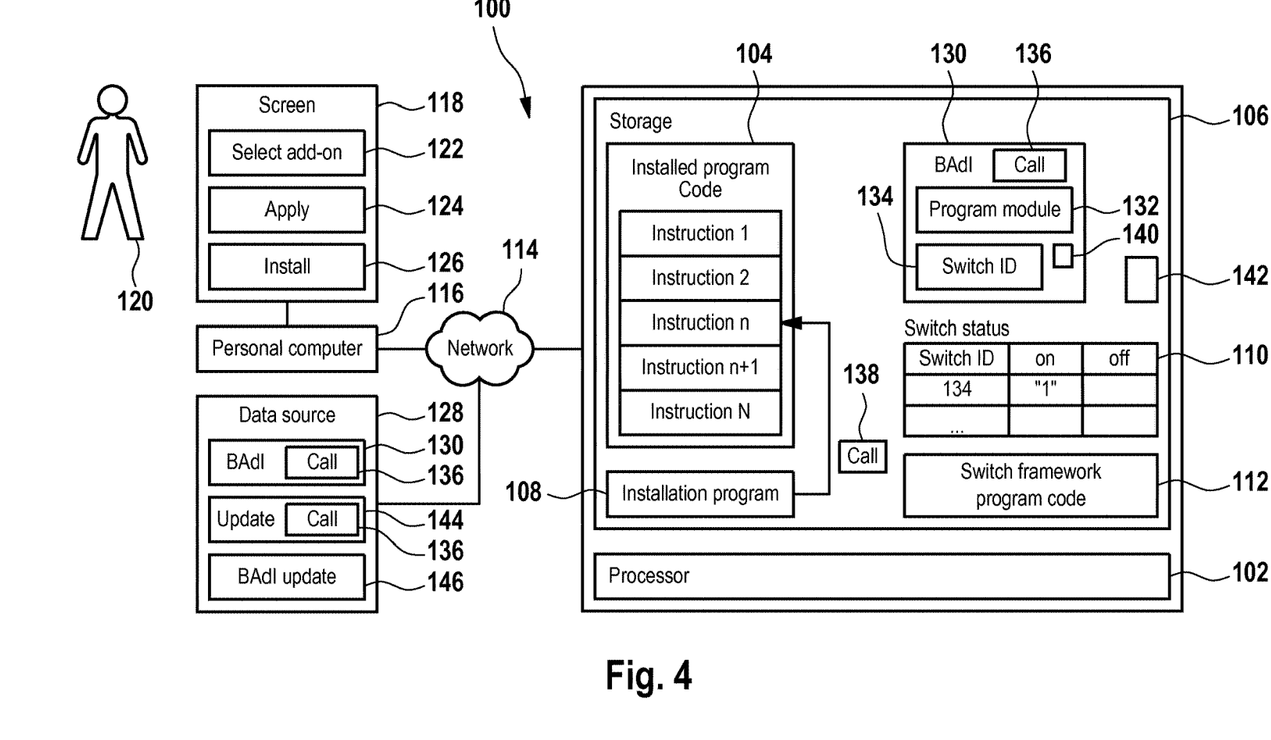
FIG. 4 illustrates an example block diagram of a computer system, according to one example embodiment of the present invention.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 303, with instructions to cause a processor, e.g., processor 302, to execute a set of steps according to one or more example embodiments of the present invention, FIG. 4 illustrates one example block diagram of a computer system 100 according to an embodiment of the present invention. The computer system 100 may include at least one processor 102 for execution of an already installed program code 104 that is stored in a storage 106 of the computer system 100. The program code 104 may comprise a number N of instructions, i.e. instruction 1, instruction 2, . . . , instruction n, instruction n+1, . . . instruction N for execution by the processor 102. In addition, an installation program 108 may be stored in the storage 106. The installation program 108 may serve to install program code.

A database table 110 of a database may be stored in the storage 106 for storing switch settings of various switches that are identified by their respective switch identifier (ID). A logical value indicating whether a given switch is 'on' or 'off' may be assigned to each switch ID listed in the database table 110.

Further, a switch framework program code 112 that provides a switch framework may be stored in the storage 106. The switch framework may be activated when a program module is due for execution by the processor 102 in case a switch is assigned to that program module. In that case the switch framework program code 112 may be invoked in order to access the database table 110 using the switch ID assigned to that switch as an access key for determining the setting of the respective switch. If the switch is 'off' execution of the program module may be skipped, otherwise, if the switch setting is set to 'on', the program module may be executed.

The computer system 100 may be coupled to a network 114, such as an Ethernet, a company's intranet or the Internet. The network 114 may be a private network or a virtual private network by means of which a plurality of personal computers (e.g., a personal computer 116) are coupled to the computer system 100. The personal computer 116 may include a display, such as a computer screen 118 for providing a graphical user interface to a user 120. The graphical user interface may comprise various virtual control buttons, such as buttons 122, 124 and 126. The user 120 may select any of these buttons such as by clicking with a computer mouse.

A data source 128 may be coupled to the computer system 100 via the network 114 as shown in FIG. 4 or may be directly connected to the computer system 100 by a local connection. Alternatively, the data source 128 may be an integral part of the computer system 100. For example, the data source 128 may be a server computer on which the data object, such as a BAdI 130 is available for downloading to the computer system 100. Alternatively, the data source 128 may be a reader, such as a CD-ROM reader, of the computer system 100 for reading a CD-ROM on which the BAdI 130 is stored.

The availability of the BAdI 130 may be signaled to the user 120 by the button 122. The user 120 may select the BAdI 130 by clicking onto the button 122. By clicking onto button 124, the BAdI 130 may be read from the data source 128 and stored in the storage 106 of the computer system 100. The BAdI 130 may comprise a program module 132 that has a switch as indicated by the switch ID 134 of the BAdI 130. Further, the BAdI 130 may comprise a specification 136 that specifies a call to be inserted into the installed program code 104.

In response to clicking on the button 126, the installation program 108 may be invoked in order to install the BAdI 130. This may be performed by modifying the program code 104, i.e. the installation program 108 inserts a call 138 to the BAdI 130 into the program code 104 as specified by the specification 136. In the example considered here, the specification 136 may specify that the call 138 is to be inserted between the instruction n and the instruction n+1 or is executed by the installation program 108 as illustrated in FIG. 4. By clicking on button 124, the user may switch on the program module 132. In other words, in response to clicking on button 124, the switch setting 'on' may be stored by the computer system 100 and stored in the database table 110 as illustrated in FIG. 4. As a consequence, the program module 132 may have been added to the program code 104. In a practical implementation, the BAdI 130 may be an integral part of an AddOn. In this case, the user may select the AddOn for installation via the user interface and the BAdI 130 may be installed as part of the AddOn installation.

When the program code 104 is executed by the processor 102, the call 138 to the BAdI 130 may be executed after execution of the instruction n. As a consequence, the execution of the program code 112 may be invoked due to the fact that a switch is assigned to the program module 132 within BAdI 130. By execution of the program code 112, the switch ID 134 may be read from the BAdI 130 and the database table 110 may be accessed for retrieving the logical value that has been assigned by the user to the switch ID 134, i.e. logical '1' or 'on' as shown in FIG. 4. As a consequence, the program module 132 may be executed by the processor 102 before the control goes back and the instruction n+1 is executed in the following.

The BAdI 130 may have an interface 140 for importation and exportation of data. For example, the interface 140 may contain a specification of the data that is to be imported when the BAdI is called by execution of the call 138. This specification may have the form of a database query for querying a database 142 that is stored in storage 106. Further, the interface 140 may comprise the specification of the data that is to be exported before the control returns from the BAdI 130 to the program code 104. In one implementation, the data is exported to the same storage locations from which the data has been imported by the interface 140.

Hence, when the call 138 is executed by the processor 102, the interface 140 of the BAdI 130 may be invoked for importation of data. As the switch of the program module 132 is on, the program module 132 may use the imported data as input data and processes the input data for modification or transformation of the input data. The resultant output data may then be exported by the interface 140 such as by writing the modified data back to the database 142 before the control goes back to the program code 104.

In case the user has decided to set the switch to 'off' or logically '0', a respective setting of the switch ID 134 may be stored in the database table 110. Upon execution of the call 138, the some procedure may be executed as if the switch was 'on' with the exception of the program module 132 that is not executed. As a consequence, the data that is imported by the interface 140 may not be modified in any way such that the identical data that has been imported is exported by the interface 140. As a consequence, the execution of the call 138 may have no effect on the data stored in database 142.

For maintenance of the program code 104, an update 144 for updating the program code 104 may be made available such as for download from the data source 128. The update 144 may comprise the specification 136 for the call 138. When the update is installed by the installation program 108, it may have the effect that the call 138 that is already present in the program code 104 is overwritten by the identical call 138. However, a user of another installation of the program code 108 may have decided not to install the BAdI 130 such that the call 138 has not been inserted into the program code 104 of that other installation before the update occurs. As a consequence, the call 138 may be inserted in all installed program codes 104 of all installations due to the update 144 irrespective of whether the BAdI 130 has been installed or not.

At a later point of time, a BAdI update 146 may be made available by data source 128, i.e. for download by a customer or it is delivered on a data carrier, such as a DVD. The BAdI update 146 may be a new version of the BAdI 130. The BAdI update 146 may be identical to the BAdI 130 except for an update of the program module 132 that is contained in the BAdI update 146 and the omission of the specification 136. The specification 136 may be omitted as the insertion of the call 138 has been integrated into the standard of the program code 104 by including it into the update 144. As a consequence, the BAdI update 146 may be executed by simply overwriting the BAdI 130 in the storage 106 without a need for running the installation program 108.

Figure 5:
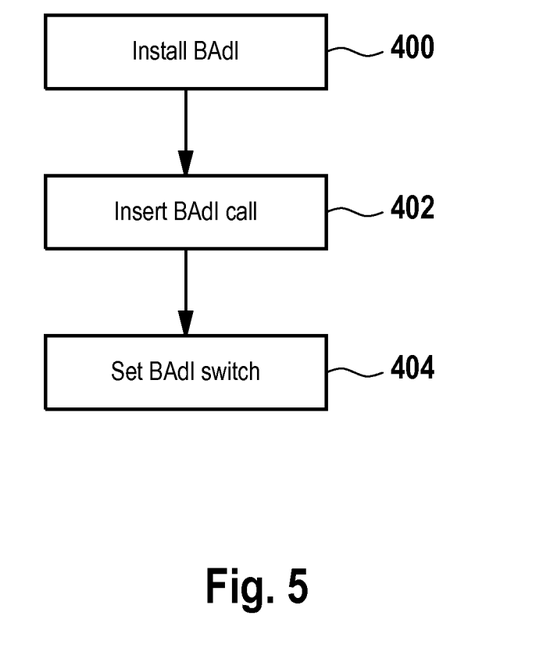
FIG. 5 illustrates one example method, according to one example embodiment of the present invention.

FIG. 5 illustrates an example method according to an embodiment of the present invention. In step 400, the installation of the BAdI 130 (cf. FIG. 4) may be started. This may be done by inserting the call 138 into the program code 104 in step 402. Further, the setting for the switch that is identified by the switch ID of the BAdI 130 may be received from the user and stored in step 404 for switching on or off the program module 132 contained in the BAdI 130.

Figure 6:
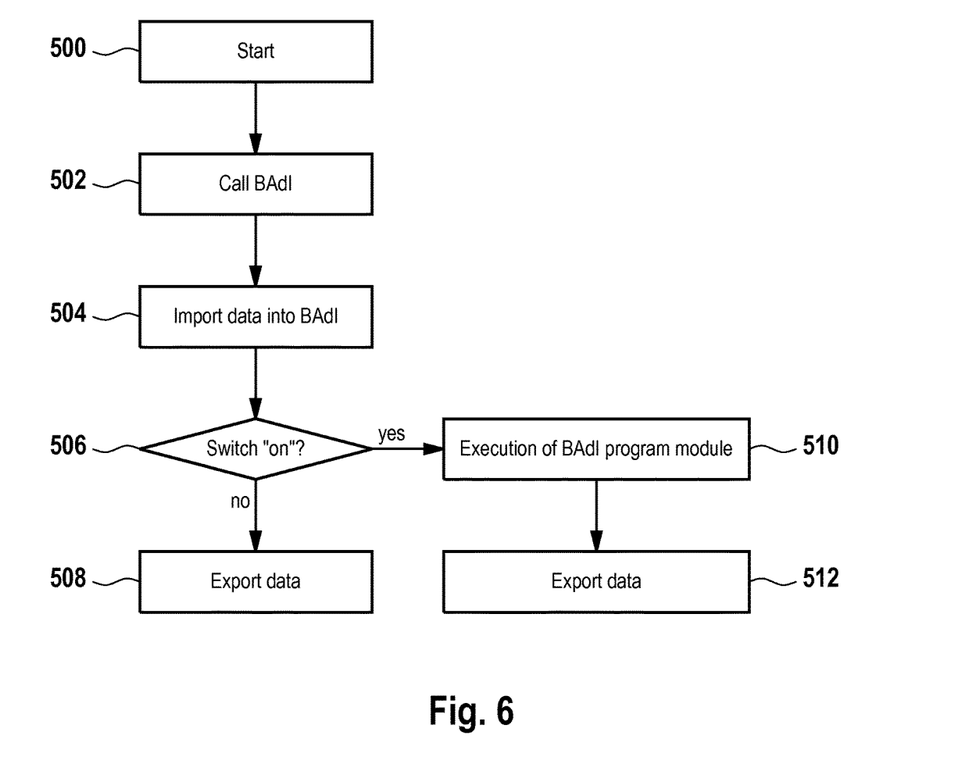
FIG. 6 illustrates one example method, according to an example embodiment of the present invention.

FIG. 6 illustrates an example method of execution of the program code 104 after installation of the BAdI 130 according to an embodiment of the present invention.

In step 500, the execution of the program code 104 may be started. After execution of the instruction n, the inserted call 138 may be executed in step 502 such that the BAdI 130 is called. In response, the interface 140 of the BAdI 130 may be invoked such that data may be imported into the BAdI in step 504, such as by reading data as specified by the BAdI 130 from the database 142. As a switch may be assigned to the program module 132 due to the presence of the switch ID 134 in the BAdI 130, execution of the program code 112 may be invoked for checking the setting stored for the switch identified by the switch ID 134. If the switch is 'on' (step 506), the program module 132 may be executed and the resultant data may be exported in step 512.

Otherwise, if the switch is 'off', the same data that has been imported in step 504 may be exported in step 508 without any modification.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

A 'computer-readable storage medium' or 'computer program product' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the Internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' or 'storage' is an example of a computer-readable storage medium. Computer memory is any memory which is directly accessible to a processor. Examples of computer memory include, but are not limited to: RAM memory, registers, and register files. References to 'computer memory' or 'memory' or 'storage' should be interpreted as possibly being multiple memories. The memory may for instance be multiple memories within the some computer system. The memory may also be multiple memories distributed amongst multiple computer systems or computing devices.

A 'computer system' as used herein encompasses to any device comprising a processor. A 'processor' as used herein encompasses an electronic component which is able to execute program code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computer system should also be interpreted to possibly refer to a collection or network of computing devices each comprising a processor or processors.

A 'user interface' as used herein is an interface which allows a user to interact with a computer or computer system. A 'user interface' may also be referred to as a 'human interface device.' A user interface may provide information or data to the user and/or receive information or data from the user. A user interface may enable input from an user to be received by the computer and may provide output to the user from the computer. In other words, the user interface may allow an user to control or manipulate a computer and the interface may allow the computer indicate the effects of the user's control or manipulation. The display of data or information on a display or a graphical user interface is an example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from a user.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A 'database' as used herein encompasses a data file or repository which contains data that may be accessed by a processor. Examples of databases are, but are not limited to: a data file, a relational database, a file system folder containing data files, a collection of data tables and a spreadsheet file.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A computer-implemented method of adding a program module to an installed program code comprising:
  providing a data object having and encapsulating an interface for importation of data into and exportation of data out of the data object, the data object further comprising and encapsulating the program module, a switch identifier and a specification of a call to be inserted into the installed code, the specification comprising a database query,
  inserting the call as specified by the specification of the data object into the installed program code,
  receiving, using a switch framework comprising a program code that is activated automatically when the data object is called, a setting for the switch from a user and storing the setting in a database table;
  updating of the installed program code after the program module has been added by providing an update for the installed program code, the update comprising the call as specified by the specification of the data object, and installing the update whereby the call that had been inserted into the installed program code is overwritten by the same call comprised in the update without affecting the setting of the switch stored in a means for storing; and
  updating the program module by the steps of:
    providing an updated data object comprising the interface, the switch identifier and the updated program module, the updated data object being devoid of the specification,
    overwriting the data object by the updated data object without affecting the installed program code and without invoking an installation program,
  wherein upon execution of the installed program code the data object is called by execution of the call that has been inserted into the installed program code,
  wherein the setting of the switch is retrieved from the database table using the switch identifier of the data object as an access key,
  wherein the switch setting indicates one of at least two logical states of the switch,
  wherein, depending on the one of at least two logical states of the switch, the imported data returned by the database query is either modified or unmodified, before being exported via the interface,
  wherein the program module comprises a modular business application, and
  wherein the installed program code is executed in full regardless of the switch setting.

2. A computer system comprising:
  an electronic processor for execution of an installed program code,
  means for storing, a data object being stored in the means for storing and having and encapsulating an interface for importation of data into and exportation of data out of the data object, the data object further comprising and encapsulating a program module, a switch identifier and a specification of a call to be inserted into the installed code, a database table for storing a setting for the switch received from a user, the specification comprising a database query,
  an installation program for installation of the data object comprising inserting the call as specified by the specification of the data object into the installed program code, and
  a user interface for receiving, using a switch framework comprising a program code that is activated automatically when the data object is called, a setting of the switch from a user and for storing the received setting in the means for storing using the switch identifier as an access key,
  the electronic processor being operable to execute the installed program code with the inserted call by calling the data object upon execution of the call that has been inserted into the installed program code,
  wherein the setting of the switch is retrieved from the database table using the switch identifier of the data object as an access key,
  wherein the switch setting indicates one of at least two logical states of the switch,
  wherein, depending on the one of at least two logical states of the switch, the imported data returned by the database query is either modified or unmodified, before being exported via the interface,
  wherein the program module comprises a modular business application,
  wherein the installed program code is executed in full regardless of the switch setting,
  wherein the means for storing stores an update for the installed program code, the update comprising the call as specified by the specification of the data object, wherein the installation program being operable to update the installed program code by the update, wherein the call that has been inserted into the installed program code is overwritten by the same call comprised in the update without affecting the setting of the switch identified by the switch identifier, and wherein the means for storing comprises the interface, the switch identifier and the updated program module, the updated data object being devoid of the specification, the computer system being operable for overwriting the data object by the updated data object without affecting the installed program code and without invoking an installation program.

3. A method for creating an add-on application, comprising:

creating, with an electronic processor and in an electronic storage medium, an add-in definition object within an add-on application development environment, wherein the add-on application is based on a foundation application, and wherein the add-on application requires at least one function that requires code modification within a modified object of the foundation application;

defining, with the electronic processor, a method in the business add-in definition object for the at least one code modification to provide the at least one function, the defined method being encapsulated by the business add-in definition object;

inserting a call to the add-in definition object in the modified object such that the modified object encapsulates the call and the call is executed every time the foundation application runs;

responsive to the execution of the call, invoking an interface for importation of data, responsive to completing development of the add-on application, copying the add-in definition into the foundation application; and responsive to a new version of the foundation application being created, copying the add-in definition into the new version, wherein the modified object is executed in full, wherein the add-in definition object is associated with a switch and is configured to be transitioned between a switched on state and a switched off state, and/or wherein the foundation application is configured as a plurality of code objects, and wherein the add-in definition object is a separate and independent code object.

4. The method of claim 3, further comprising:

waiting for the modified object to be updated during a regular development cycle of the foundation application before integrating the at least one function into the foundation application.

5. The method of claim 3, wherein inserting a call includes importing variables, and/or wherein inserting a call includes changing pre-existing variables of the foundation application, and/or wherein defining a method and inserting a call are configured to modify a pre-existing execution sequence in the foundation application, wherein the add-on application preferably includes a plurality of add-in definition objects.

6. A system for creating an add-on application, comprising:

an electronic processor configured to:
create an add-in definition object within an add-on application development environment, wherein the add-on application is based on a foundation application, and wherein the add-on application requires at least one function that requires code modification within a modified object of the foundation application;

define a method in the business add-in definition object for the at least one code modification to provide the at least one function, the defined method being encapsulated by the business add-in definition object;

insert a call to the add-in definition object in the modified object such that the modified object encapsulates the call and the call is executed every time the foundation application runs;

responsive to execution of the call, invoking an interface for importation of data;

responsive to completing development of the add-on application, copy the add-in definition into the foundation application; and responsive to a new version of the foundation application being created, copy the add-in definition into the new version, wherein the modified object is executed in full, wherein the add-in definition object is associated with a switch and is configured to be transitioned between a switched on state and a switched off state, and/or wherein the foundation application is configured as a plurality of code objects, and wherein the add-in definition object is a separate and independent code object.

7. The system of claim 6, wherein the electronic processor is further configured to:

wait for the modified object to be updated during a regular development cycle of the foundation application before integrating the at least one function into the foundation application.

8. The system of claim 6, wherein inserting a call includes importing variables, and/or wherein inserting a call includes changing pre-existing variables of the foundation application, and/or wherein defining a method and inserting a call are configured to modify a pre-existing execution sequence in the foundation application, and/or wherein the add-on application includes a plurality of add-in definition objects.

9. A non-transitory computer-readable storage medium encoded with instructions configured to be executed by a processor, the instructions which, when executed by the processor, cause the performance of a method, comprising:

creating, with an electronic processor and in an electronic storage medium, an add-in definition object within an add-on application development environment, wherein the add-on application is based on a foundation application, and wherein the add-on application requires at least one function that requires code modification within a modified object of the foundation application;

defining, with the electronic processor, a method in the business add-in definition object for the at least one code modification to provide the at least one function, the defined method being encapsulated by the business add-in definition object;

inserting a call to the add-in definition object in the modified object such that the modified object encapsulates the call and the call is executed every time the foundation application runs;

responsive to execution of the call, invoking an interface for importation of data;

responsive to completing development of the add-on application, copying the add-in definition into the foundation application; and responsive to a new version of the foundation application being created, copying the add-in definition into the new version, where defining a method and inserting a call are preferably configured to modify a pre-existing execution sequence in the foundation application, wherein the modified object is executed in full,
wherein the add-in definition object is associated with a switch and is configured to be transitioned between a switched on state and a switched off state, and/or wherein the foundation application is configured as a plurality of code objects, and wherein the add-in definition object is a separate and independent code object.

10. The non-transitory computer-readable storage medium of claim 9, wherein the method further comprises:
waiting for the modified object to be updated during a regular development cycle of the foundation application before integrating the at least one function into the foundation application.

11. The non-transitory computer-readable storage medium of claim 9, wherein inserting a call includes importing variables, and/or wherein inserting a call includes changing pre-existing variables of the foundation application, and/or wherein defining a method and inserting a call are configured to modify a pre-existing execution sequence in the foundation application, wherein the add-on application preferably includes a plurality of add-in definition objects.

* * * * *